April 25, 1933.   G. J. RUSSELL   1,905,508
BROACH CENTERING APPARATUS
Filed Jan. 30, 1930
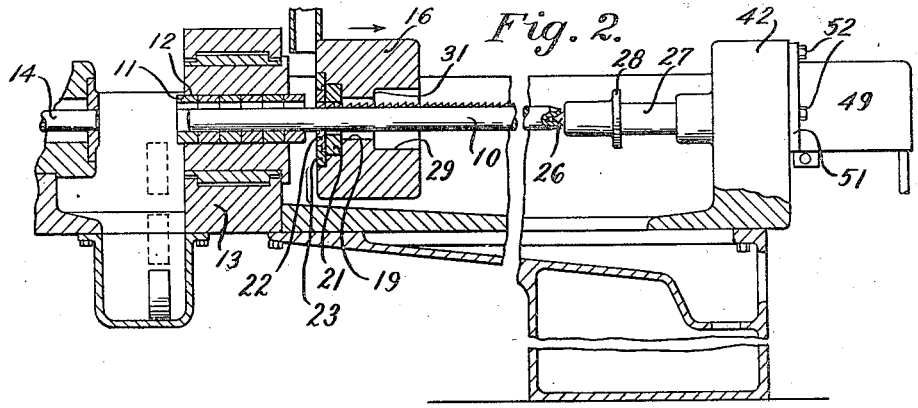
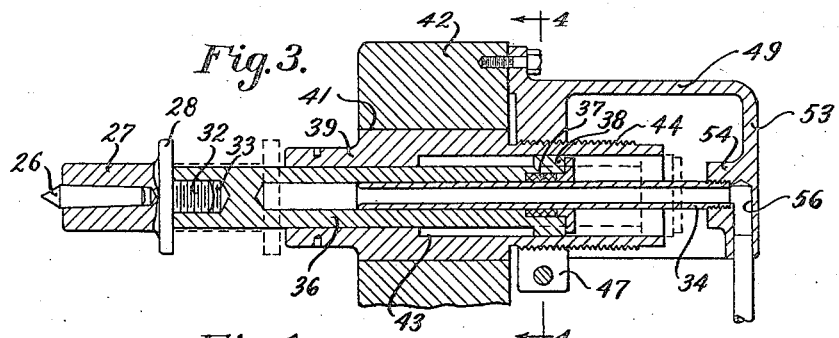
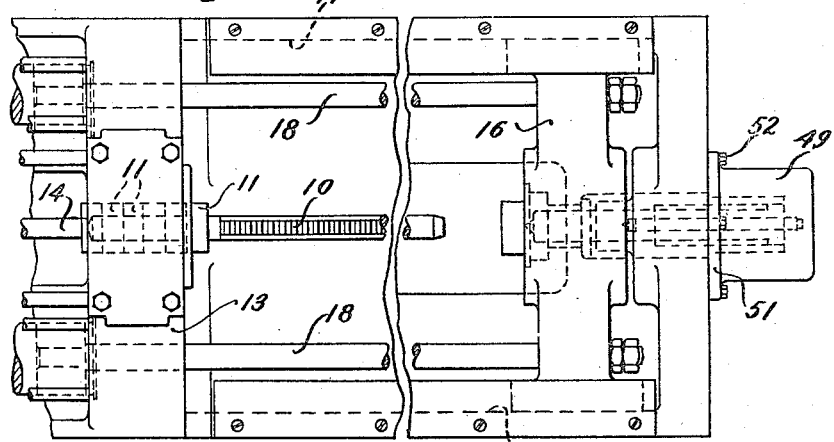
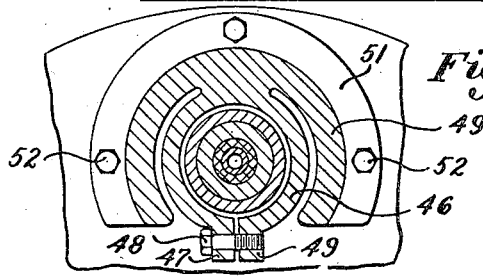
Inventor.
George J. Russell.
by Roberts, Cushman & Woodbury
Att'ys.

Patented Apr. 25, 1933

1,905,508

UNITED STATES PATENT OFFICE

GEORGE J. RUSSELL, OF WALTHAM, MASSACHUSETTS

BROACH CENTERING APPARATUS

Application filed January 30, 1930. Serial No. 424,559.

This invention relates to broaching and to broaching machines of the type in which the broach is held in a substantially stationary position while stock to be broached is advanced along the broach. In machines of this general class it is necessary properly to center the forward end of the broach relative to the work and preliminary to the cutting operation. Under conditions of operation these machines have not been entirely satisfactory, but have exhibited a tendency to set up vibratory forces in the broach.

Objects of the present invention are to provide for overcoming these difficulties and to provide machines of the class described with improved means for supporting a broach; to provide apparatus for supporting both ends of a broach; to provide for maintaining the front end of a broach properly centered during broaching operations; to provide a movable center for cooperating with an abutment member to hold the broach in a definite position; to provide improved means for supporting and operating the center; to provide for a compact, nested arrangement of the center and the stock carrier and thereby to avoid any appreciable increase in the over-all dimensions of the apparatus; and also to provide an apparatus of the class described having an improved construction and arrangement of parts.

According to the present invention a front-center may be advanced to hold the front end of a broach properly centered and also to assure that the rear end of the broach is firmly disposed against an abutment provided for this purpose. In this way the end broach is held rigid and free from vibration. Apparatus for these purposes may be arranged so that the carrier, which advances stock to be broached, will cooperate with the front-center to withdraw the same so that stock from a source of supply may be positioned and advanced along the broach without delay.

In the drawing:

Fig. 1 is a top plan view of a portion of a broaching machine;

Fig. 2 is a sectional elevation of the apparatus shown in Fig. 1, but with the movable parts thereof in different relative positions;

Fig. 3 is a sectional elevation of the back center shown in Figs. 1 and 2; and

Fig. 4 is a section on the line 4—4 of Fig. 3.

In the illustrated embodiment of the invention the broach 10 is supported at its rear end in a series of blanks or previously broached pieces of stock 11 which are disposed in a longitudinal passage 12 in the transverse member 13. During the broaching operation a movable abutment 14 is held in engagement with the rear end of the broach to hold the latter stationary while the stock to be broached is advanced by the reciprocating head or carrier 16. In Fig. 1 the parts are shown in position to begin the broaching operation, the abutment 14 being in engagement with the rear end of the broach and the stock carrier 16 being withdrawn into a position to receive and to advance a piece of stock along the broach. This stock carrier or cross-head 16 is mounted for reciprocatory motion in longitudinal guideways 17 disposed at the sides of the machine, and power for effecting this reciprocation is transmitted to the cross-head through the rods 18 which are connected to the cross-head and to any suitable apparatus for developing a reciprocatory motion. The manner in which the rear end of the broach is supported and in which the movable abutment is operated to engage the rear end during broaching and to disengage the rear end subsequent to the broaching to permit broached stock to be removed is all fully explained in my prior patent, No. 1,481,437 and copending application Serial No. 424,558, filed on even date herewith.

With the parts in the position shown in Fig. 2, the carrier has just completed its advance or broaching stroke and has started on its return stroke, and the movable abutment 14 has been withdrawn from the rear end of the broach. From this view it will be seen that the carrier 16 has a passage 19 to receive the broach, and that the forward end of this passage is enlarged to receive a filler ring 21 having an inside diameter preferably smaller than the passage 19 and slightly larger than the body of the broach. An outer plate 22, having an opening of substantially the same contour as the broach and of a size closely to fit the broach used, is locked against the filler plate by a locking plate 23. The locking plate may be secured to the carrier 16 by means of screws (not shown) or in any other approved manner, and preferably the adjoining edges of the locking plate 23 and the broach engaging plate 22 have interlocking engagement, as shown. During the broaching operation, the inner or broach receiving plate 22 acts as a steady rest for the broach, and thus tends to prevent vibration.

To further assist in supporting the broach and to steady the same, a front-center 26 is arranged to be held in engagement with the front end of the broach during the broaching. This center is disposed in a suitable recess in a center retaining member 27 which has an exterior collar 28 spaced from the forward end thereof and receivable in the counterbore 29 in the stock carrier, the collar being so positioned and the counterbore being of such length that these parts will be received within the stock carrier in the manner shown in dotted lines in Fig. 1. From this figure, it will be apparent that the interior shoulder 31 formed at the end of the counterbore will engage the collar 28 on the stock retaining member to hold the center within the stock carrier when the latter is withdrawn so that the center will not interfere with supplying stock to the broach. The forward portion of the stock retaining member is preferably made separate from the rear portion, being attached thereto by a stud 32 formed integral with the forward portion and fitting in a tapped and threaded bore 33 in the rear portion. The collar 28 is formed on the detachable forward end of the center retaining member.

The center 26 is arranged to be advanced by means of fluid pressure, the apparatus for this purpose comprising inner and outer tubular members, 34, 36 having sliding engagement with each other, the outer member preferably being the rear end of the center retaining member. The rear end of this outer member is fitted with a suitable packing 37 so that these telescoping tubular members will be in fluid-tight relation and a head or enlargement 38 is formed on the rear end of the outer member. This outer member is slidably received within a sleeve 39, which in turn is slidably received in a longitudinal opening or bore 41 disposed in the fixed support 42. The sleeve has a counterbore 43 extending inwardly from the rear end and the forward end of this counterbore cooperates with the head 38 formed on the outer tubular member to limit forward displacement of the center retaining member. The sleeve 39 has exterior threads 44 at the rear end thereof, and these threads fit corresponding interior threads in an annular band 46. This band is split on the under side of the sleeve and carries depending lugs 47 in which a bolt 48 may be fitted to contract the band to lock the latter about the sleeve 39. The upper portion of the band is formed integrally (Fig. 4) with an outer substantially cylindrical wall member 49 which has an exterior attaching flange 51 secured to the fixed support 42 by means of attaching bolts 52. This cylindrical wall member carries a transverse wall 53 having an interior boss 54 to receive the outer end of the inner tubular member 34. A passage 56 is formed through this transverse wall 53 and the boss 54 for conducting pressure fluid within the inner and outer tubular members 34, 36 for advancing the back center.

This apparatus provides a simple and yet efficient way for assembling a back-center on a broaching machine of the class described. It will be observed that the sleeve may be adjusted longitudinally to meet different requirements by loosening the bolt 48 which contracts the annular band, and after such adjustment the band is again contracted to hold the sleeve in fixed position. The arrangement by which this clamping band 46 and the support for the outer end of the inner tubular member are made as a unitary structure is also advantageous as this unitary casting is relatively inexpensive to manufacture and as will be apparent it is readily attachable.

I claim:

1. In a broaching machine, the combination of a broach, means for holding the broach substantially stationary during broaching, a center engageable with the front end of the broach and fluid-pressure means for advancing the center to a fixed position in engagement with the broach and for holding the center in this fixed position during broaching.

2. In a broaching machine, the combination of a broach, means for holding the broach substantially stationary during broaching, a center movable between the position spaced from the broach and a fixed position in engagement with the front end of the broach, fluid-pressure means for displacing the center in one direction, and other means for displacing the center in the opposite direction.

3. In a broaching machine of the class described, the combination of a broach, means for holding the broach substantially stationary during broaching, a carrier for advancing stock to be broached, means for advancing and withdrawing the carrier, a center movable to a fixed position in engagement with the front end of the broach, and means engageable with the carrier for displacing the center from the broach.

4. In a broaching machine of the class described, the combination of a broach, means for holding the broach substantially stationary during broaching, a carrier for advancing stock to be broached, means for advancing and withdrawing the carrier, a center movable to a fixed position in engagement with the front end of the broach, means engageable with the carrier for withdrawing the center, and other means for advancing the center.

5. In a broaching machine of the class described, the combination of a broach, means for holding the broach substantially stationary during broaching, a carrier for advancing stock to be broached, means for advancing and withdrawing the carrier, a center engageable with the front end of the broach, a center retaining member movable between a position in which the center engages the broach and a position in which the center is spaced therefrom, and cooperating abutments on the carrier and on the center retaining member for displacing the center between these positions.

6. In a broaching machine of the class described, the combination of a broach, means for holding the broach substantially stationary during broaching, a carrier for advancing stock to be broached, means for advancing and withdrawing the carrier, a center engageable with the front end of the broach, a center retaining member movable between a position in which the center engages the broach and a position which the center is spaced therefrom, a collar on the center retaining member, the carrier having a passage to receive the center retaining member, and an interior shoulder in the passage and engageable with the collar for displacing the center between these positions.

7. In a broaching machine of the class described, the combination of a broach, means for holding the broach substantially stationary during broaching, a carrier for advancing stock to be broached, means for advancing and withdrawing the carrier, a center engageable with the front end of the broach, a movable center retaining member, a collar on the center retaining member, the carrier having a passage therethrough to receive the broach and of a size to receive the forward end of the center retaining member, said passage having a counterbore to receive the collar, and abutment means engageable with the collar for limiting movement of the center retaining member in at least one direction.

8. In an apparatus of the class described, the combination of inner and outer tubular members in slidable engagement with each other, a center on one of the tubular members, means for admitting pressure fluid to the tubular members for advancing the center, a sleeve for slidably supporting the outer tubular member, a fixed member having an opening slidably to receive the sleeve, and means for securing the sleeve in adjusted positions in the fixed member.

9. In an apparatus of the class described, the combination of inner and outer tubular members in slidable engagement with each other, a center on one of the tubular members, means for admitting pressure fluid to the tubular members for displacing the center, a stationary sleeve for slidably supporting the outer tubular member, a fixed support for the sleeve, means for holding the sleeve in adjusted positions in the fixed support, the sleeve having a counterbore, a head on the outer tubular member and fitting the counterbore, whereby the head may serve as a stop upon engagement with the end of the counterbore for limiting outward movement of the outer tubular member.

10. In an apparatus of the class described, the combination of inner and outer tubular members in slidable engagement with each other, a center on one of the tubular members, a fixed support having an opening slidably to receive a sleeve, a sleeve slidably disposed in said opening and receiving the outer tubular member, a contractible ring encompassing the sleeve and affixed to the fixed support, and means for contracting the ring about the sleeve for securing the latter in adjusted positions in the fixed support.

11. In an apparatus of the class described, the combination of inner and outer tubular members disposed in slidable engagement with each other, a center on one of the tubular members, a sleeve for slidably supporting the outer tubular member, an axially split annular band encompassing the sleeve, means for clamping the band about the sleeve, a cylindrical wall member disposed outside the band, and integrally united thereto, a transverse wall carried by the cylindrical wall member, a boss on the transverse wall for supporting the end of the inner tubular member, the transverse wall having a passage therein for admitting fluid to the inner tubular member.

12. The combination as set forth in claim 11, and a fixed support having an opening in which the sleeve is slidably disposed, and means for securing the cylindrical wall member to the fixed support.

13. The combination as set forth in claim 11, and a fixed support having an opening in which the sleeve is slidably disposed, an exterior flange on the cylindrical wall member, and means for securing the exterior flange to the fixed support.

14. In a broaching machine of the class described, the combination of a broach, means for holding the broach substantially stationary during broaching, a carrier for advancing stock to be broached, means for advancing and withdrawing the carrier, a center engageable with the front end of the broach, a movable center retaining member, a collar on the center retaining member, the carrier having a passage therethrough to receive the broach and of a size to receive the forward end of the center retaining member, said passage having a counterbore to receive the collar, this counterbore terminating at a point sufficiently toward the rear of the carrier to be effective upon engagement with the collar to hold the center substantially within the carrier when the latter is withdrawn.

15. The combination of a center engageable with an element for centering the same, means for supporting the center for axial movement between a withdrawn position and a position in which the center is advanced for engagement with the element, fluid pressure means for holding the center in engagament with the element, and a member movable in opposite directions in timed relation, said member engaging the center for returning the latter to its withdrawn position against the force exerted by the fluid pressure.

16. In a broaching machine, the combination of a broach, an abutment movable to a fixed position in engagement with the rear end of the broach, a movable center engageable with the front end of the broach, and means for holding the abutment and the center fixed in engagement with the broach to hold the latter stationary during broaching.

Signed by me at Boston, Massachusetts, this twenty-seventh day of January, 1930.

GEORGE J. RUSSELL.